Patented May 9, 1939

2,157,341

UNITED STATES PATENT OFFICE 2,157,341

VAT DYESTUFFS AND PROCESS OF MAKING SAME

Walter Kern, Sissach, Switzerland, assignor to the firm Society of Chemical Industry in Basle, Basel, Switzerland No Drawing. Application July 6, 1937, Serial No. 152,271. In Switzerland July 9, 1936

6 Claims. (Cl. 260—396)

This invention relates to the manufacture of vat dyestuffs by heating pyrene or a substitution product thereof with aqueous sulfuric acid.

Substitution products of pyrene which come into question are hydroxy-pyrenes, amino-pyrenes, hydroxy-pyrene-sulfonic acids, amino-pyrene-sulfonic acids, and alkoxy-pyrene-sulfonic acids the alkoxy-group of which may for example be a methoxy-, an ethoxy-, a propoxy- or a buthoxy-group; especially good results are obtained when hydroxy-pyrene-sulfonic acids are used.

The temperature at which these bodies are treated with aqueous sulfuric acid depends on the water content of the sulfuric acid, and must be the higher the more dilute the sulfuric acid. Suitable temperatures are between 130 and 250° C. and sulfuric acid of 40–90% strength is advantageously used.

A further feature of the invention consists in treating the product obtained with agents which effect substitution or condensation or both. As such may be mentioned, for example, amines, for instance amino-anthraquinones or halogenating or nitrating agents. In this manner further valuable products are obtained.

The products which contain sulfur and are very sparingly soluble even in solvents of high boiling point, for example trichlorobenzene or α-chloronaphthalene, may be purified by vatting them or by dissolving them in concentrated sulfuric acid and reprecipitation by water; they may be converted by known methods into their leuco-derivatives, for example their leuco-esters.

The products are valuable dyestuffs and may be used, for example, for dyeing and printing vegetable fibres, for instance cotton. The following examples illustrate the invention; the parts being by weight, and the parts by volume having the same ratio to parts by weight that the litre has to the kilo:

Example 1

65.4 parts of 3-hydroxy-pyrene are introduced in the course of 1½ hours into 270 parts of sulfuric acid monohydrate at 10–20° C., and to the mixture at the same temperature 240 parts of fuming sulfuric acid of 65% strength are added by drops. To complete the sulfonation the whole is stirred for 24 hours at 20–22° C. and then after the mass is mixed with 185 parts of ice and kept while stirring for 7 hours at a bath temperature of 190–200° C. After cooling, the whole is diluted with water, filtered with suction, boiled with sodium carbonate solution of 3% strength and vatted for purification. The dyestuff which is insoluble in the usual solvents is a black powder which melts at a temperature above 460° C.; it dissolves in concentrated sulfuric acid to a brown-black solution and dyes cotton in a green-black vat violet-black fast tints. The analysis of this dyestuff shows that it contains sulfur.

Example 2

10 parts of hydroxy-pyrene-disulfonic acid are mixed with 200 parts of sulfuric acid of 65% strength and the mixture is maintained for 16 hours at a bath temperature of 190–200° C. After the cooling the mass is diluted with water, filtered and the solid matter freed from impurities by extraction with boiling caustic soda solution of 3% strength. The dyestuff is a black powder which melts at a temperature above 460° C.; it dissolves in concentrated sulfuric acid to a grey-black solution and dyes cotton in a green vat violet-black tints.

A similar dyestuff is obtained by heating a solution of 3-hydroxypyrene-disulfonic acid in sulfuric acid of 93% strength at a bath temperature of 135–140° C. for 10 hours or in sulfuric acid of 55% strength under pressure at 185–190° C. also for 10 hours.

The 3-hydroxy-pyrene-disulfonic acid used in this example is made as follows: 43.6 parts of 3-hydroxy-pyrene are dissolved in 480 parts of nitrobenzene; there are added in the course of half an hour at 8–10° C. and while stirring 48 parts of chlorosulfonic acid drop by drop. Stirring is continued for 2 hours at 20–25° C. Finally, for completing the reaction the mass is kept at a temperature of 50–60° C. for two hours. The 3-hydroxy-pyrene-disulfonic thus produced will have separated from the solution and after cooling may be filtered and washed with benzene; it is obtained in very good yield.

Example 3

10 parts of potassium 3-hydroxy-pyrene-monosulfonate are heated with 180 parts of sulfuric acid of 75% strength to a bath temperature of 190° C. and kept for 10 hours at this temperature. After cooling the mass is diluted with water and filtered; the solid matter is washed and extracted with boiling dilute sodium carbonate solution. The dyestuff is a black powder similar in its properties to the dyestuff obtained as described in Example 2.

The 3-hydroxy-pyrene-monosulfonate used in this example is made by introducing 65.4 parts of 3-hydroxy-pyrene into 720 parts of nitrobenzene and dropping into the mixture in course of ¾ hours while stirring 36 parts of chlorosulfonic acid. When the reaction is complete, the temperature is kept for 3 hours at that above named and then raised to 18–21° C. while stirring continues through the night. The mixture is filtered and the residue freed by steam distillation from the last traces of nitrobenzene. The aqueous solution of 3-hydroxy-pyrene-monosulfonic acid is mixed with animal charcoal, boiled and filtered with suction. By salting-out with potassium chloride there is obtained a good yield of potassium salt of a 3-hydroxy-pyrene-monosulfonic acid in the form of colourless lustrous crystals.

*Example 4*

10.9 parts of 3-hydroxy-pyrene are suspended in 300 parts of sulfuric acid of 75% strength and the suspension is heated to 190° C bath temperature and kept at this temperature for 7 hours. When cold, the mass is diluted with water and the dyestuff isolated by filtration, washing and extraction with boiling caustic soda lye of 3% strength. It is a black powder soluble in concentrated sulfuric acid to a black-grey solution and dyes cotton in a black-olive vat violet-black tints.

Similar dyeing vat dyestuffs are obtained by using alkoxy-pyrenes, such as for example methoxy-, ethoxy-, propoxy- or buthoxy-pyrenes instead of the 3-hydroxy-pyrene.

*Example 5*

12 parts of pyrene are suspended in 300 parts of sulfuric acid of 75% strength. The suspension is heated to bath temperature of 190–195° C. which is maintained for 16 hours. After cooling, the mass is diluted with water, filtered with suction, washed and extracted by boiling caustic soda lye of 2% strength. The dyestuff is a black powder which colours sulfuric acid brown, melts above 460° C. and dyes cotton in a green vat blackish-olive tints.

*Example 6*

10.9 parts of 3-amino-pyrene and 180 parts of sulfuric acid of 75% strength are heated together in a reflux apparatus for 16 hours at 190–200° C. After cooling the mass is diluted with water, filtered, and the solid matter extracted by boiling caustic soda lye of 3% strength to purify it. The dyestuff is a black powder which melts above 460° C., dissolves in concentrated sulfuric acid to a black-brown solution and dyes cotton in a brown vat blackish-brown tints.

A similar dyestuff is obtained when the 3-amino-pyrene-monosulfonic acid made by monosulfonating 3-amino-pyrene with sulfuric acid monohydrate is heated with sulfuric acid of 75% strength for 16 hours at 190–200° C.

*Example 7*

5 parts of the dyestuff obtained as described in Example 1 are suspended in 180 parts of nitrobenzene, some iodine is added and at 60° C. 8.5 parts of sulfuryl chloride are introduced drop by drop in the course of half an hour. The mass is stirred for 4 hours at 60° C., much hydrochloric acid being evolved, and finally the reaction is finished by raising the temperature for 16 hours to 92–96° C., the mass is then allowed to cool to 80° C., filtered, and the solid matter washed in benzene and alcohol. The dyestuff thus obtained in very good yield is a black powder melting above 460° C.; it colours concentrated sulfuric acid black-grey and dyes cotton in a green-black vat violet-black tints.

A similar dyestuff is obtained if the chlorination is conducted by passing chlorine into the solution of the dyestuff obtained according to Example 1 in concentrated sulfuric acid.

*Example 8*

50 parts of the dyestuff obtained as described in Example 1 are suspended in 1800 parts of nitrobenzene, some iodine is added and at 60° C. 90 parts of bromine are introduced by drops in the course of half an hour. The mass is then stirred for 4 hours at 60–65° C. and to complete the reaction the temperature is raised to 92–96° C. at which it is maintained for 16 hours. After cooling to 80° C. the whole is filtered with suction, the solid matter washed and dried. The dyestuff thus obtained in good yield is a black powder which melts above 460° C., dissolves in concentrated sulfuric acid to a violet-black solution and dyes cotton in a black-green vat brown-black tints.

A similar dyestuff for dyeing cotton tints which are more violet-black is obtained when the bromination is conducted in concentrated sulfuric acid.

*Example 9*

20 parts of the dyestuff obtained as described in Example 8 and 30 parts of α-amino-anthraquinone, 30 parts of anhydrous sodium acetate and 26 parts of cuprous chloride are suspended in 1200 parts of nitrobenzene and the whole is boiled for 10 hours. After cooling and filtering, the solid matter is washed and purified by extraction with hydrochloric acid of 3% strength. The dyestuff is a black powder which melts above 460° C., dissolves in concentrated sulfuric acid to a black-grey solution and dyes cotton in a green vat violet-black tints.

*Example 10*

20 parts of the dyestuff obtained as described in Example 8, 30 parts of aniline, 30 parts of anhydrous sodium acetate and 26 parts of cuprous chloride are suspended in 1200 parts of nitrobenzene and the whole is boiled for 10 hours. After cooling, the solid matter is filtered, washed and extracted with boiling hydrochloric acid of 3% strength; the dyestuff is a black powder which melts above 460° C., colours concentrated sulfuric acid grey-black and dyes cotton in a green vat violet-black tints.

*Example 11*

30 parts of the dyestuff obtained as described in Example 8, 300 parts of aniline, 45 parts of anhydrous sodium acetate and 39 parts of cuprous chloride are together heated under reflux for 10 hours to boiling. The whole is then filtered hot, the solid matter is washed with benzene and alcohol and extracted with hot dilute hydrochloric acid for removing copper compounds. The dyestuff obtained in very good yield is a black powder melting above 460° C., soluble in concentrated sulfuric acid to a grey-black solution and dyeing cotton in a green vat grey tints. The dyestuff is distinguished from that described in Example 10 by a larger content of nitrogen.

*Example 12*

5 parts of the dyestuff obtained as described in Example 1 are suspended in 60 parts of nitrobenzene and at a temperature of 20° C. there is added by drops in the course of half an hour a mixture of 2 parts of nitric acid of 98% strength and 12 parts of nitrobenzene. To complete the reaction stirring is continued for 16 hours at 10–20° C.; the whole is then filtered and the dyestuff washed with benzene and alcohol. It is a black powder soluble in concentrated sulfuric acid to a black-olive solution and dyeing cotton in a green vat brown-violet tints.

What I claim is:

1. Process for the production of vat dyestuffs, consisting in heating pyrenes of the general formula

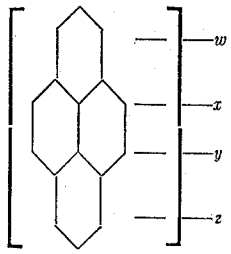

wherein $w$, $x$, $y$ and $z$ are members of the group consisting of hydrogen, hydroxyl, alkoxy, amino and sulfonic acid, with aqueous sulfuric acid until vat dyestuffs are formed.

2. Process for the production of vat dyestuffs, consisting in heating hydroxy-pyrene-sulfonic acids with aqueous sulfuric acid until vat dyestuffs are formed.

3. Process for the production of vat dyestuffs, consisting in heating hydroxy-pyrene-sulfonic acids with aqueous sulfuric acid of 40 to 90 per cent. strength to 130 to 250° C. until vat dyestuffs are formed.

4. Vat dyestuffs obtained by heating pyrenes of the general formula

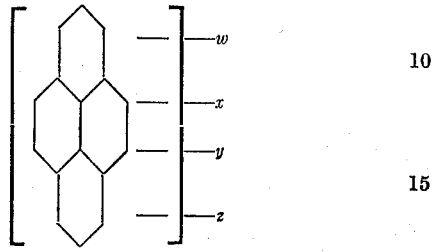

wherein $w$, $x$, $y$ and $z$ are members of the group consisting of hydrogen, hydroxyl, alkoxy, amino and sulfonic acid, with aqueous sulfuric acid until vat dyestuffs are formed.

5. Vat dyestuffs obtained by heating hydroxy-pyrene-sulfonic acids with aqueous sulfuric acid until vat dyestuffs are formed.

6. Vat dyestuffs obtained by heating hydroxy-pyrene-sulfonic acids with sulfuric acid of 40 to 90 per cent. strength to 130 to 250° C. until vat dyestuffs are formed.

WALTER KERN.